US 9,581,964 B2

(12) United States Patent
Gioia

(10) Patent No.: US 9,581,964 B2
(45) Date of Patent: Feb. 28, 2017

(54) METHOD OF CODING A HOLOGRAPHIC PATTERN, A CORRESPONDING CODING DEVICE AND COMPUTER PROGRAM

(71) Applicant: Orange, Paris (FR)

(72) Inventor: Patrick Gioia, Servon-sur-Vilaine (FR)

(73) Assignee: ORANGE, Paris (FR)

( * ) Notice: Subject to any disclaimer, the term of this patent is extended or adjusted under 35 U.S.C. 154(b) by 231 days.

(21) Appl. No.: 14/379,168

(22) PCT Filed: Feb. 12, 2013

(86) PCT No.: PCT/FR2013/050284
§ 371 (c)(1),
(2) Date: Aug. 15, 2014

(87) PCT Pub. No.: WO2013/121140
PCT Pub. Date: Aug. 22, 2013

(65) Prior Publication Data
US 2015/0029566 A1    Jan. 29, 2015

(30) Foreign Application Priority Data

Feb. 15, 2012  (FR) ..................... 12 51402

(51) Int. Cl.
*G03H 1/08* (2006.01)
*G03H 1/22* (2006.01)
(52) U.S. Cl.
CPC ......... *G03H 1/0841* (2013.01); *G03H 1/0808* (2013.01); *G03H 1/22* (2013.01); *G03H 2001/2242* (2013.01)
(58) Field of Classification Search
CPC ...... G03H 1/08; G03H 1/0808; G03H 1/0841; G03H 1/265; G03H 1/2645; G03H 1/0276;
(Continued)

(56) References Cited

U.S. PATENT DOCUMENTS

2004/0021768 A1* 2/2004 Payne ................. G02B 27/225
348/51
2008/0259419 A1* 10/2008 Wilson ................ G03H 1/0808
359/9
(Continued)

FOREIGN PATENT DOCUMENTS

DE    WO 2011121130 A2 *  10/2011  ........... G03H 1/0808

OTHER PUBLICATIONS

Darakis et al. (Visually lossless compression of digital hologram sequences, SPIE vol. 7529, pp. 752912-1-8) (2010).*
Seo et al. (A new coding technique of Digital Hologram Video based on View-Point MCTF, Proc. of SPIE vol. 6392, pp. 63920S-1-8) (2006).*
Liebling et al., "Fresnelets: new multiresolution wavelet bases for digital holography", IEEE Trans. Image Processing, vol. 12, No. 1, Jan. 2003.
Plesniak et al., "Reconfigurable image projection holograms", Optical Engineering 45(11), 115801 (Nov. 2006).
(Continued)

*Primary Examiner* — Kimberly N Kakalec
(74) *Attorney, Agent, or Firm* — David D. Brush; Westman Champlin and Koehler, P.A.

(57) ABSTRACT

A method for coding at least one holographic pattern recording a light signal representative of light received by a perspective object in a scene. The method includes: determining, from the light signal and for each point $x_j (1 \le j \le M)$ of the holographic pattern, a set of N light rays passing through the point and corresponding respectively to N different viewing positions for viewing the pattern; generating from the M sets of N determined light rays, a plurality N of two-dimensional views of the object corresponding respectively to the N viewing positions of the pattern, by causing M determined rays to intersect at each of the viewing positions that are contained in a viewing plane parallel to a plane containing the holographic pattern; arranging the N generated views as a multi-view image of the object, the N views corresponding respectively to sub-images of the multi-view image; and compressing the multi-view image.

8 Claims, 5 Drawing Sheets

(58) Field of Classification Search
CPC ........... G03H 2210/40; G03H 2210/44; G03H 2001/2655; H04N 1/41
USPC ..................................................... 359/1–35
See application file for complete search history.

(56) References Cited

U.S. PATENT DOCUMENTS

| | | | |
|---|---|---|---|
| 2010/0033780 A1* | 2/2010 | Gitter | G03H 1/0808 359/9 |
| 2010/0149610 A1* | 6/2010 | Schwerdtner | G03H 1/0808 359/32 |
| 2013/0250382 A1* | 9/2013 | Wiltshire | G03H 1/24 359/23 |

OTHER PUBLICATIONS

Yamamoto et al., "84K4 size computer generated hologram for 3D visual system using rendering technology", 2010 4th International Universal Communication Symposium (IUCS), Oct. 2010, pp. 193 196.

International Search Report and Written Opinion dated May 28, 2013 for corresponding International Patent Application No. PCT/FR2013/050284, filed Feb. 12, 2013.

Darakis et al.: "Compression of Digital Hologram SEquences using MPEG-4", Proceedings of SPIE, Jan. 1, 2009 (Jan. 1, 2009), pp. 735811-735811-8 , XP055032800.

Le Thanh Bang et al.: "Compression of Digital Hologram for 3D Object using Wavelet-Bandelets Transform", Proceedings of SPIE, Jan. 1, 2011 (Jan. 1, 2011), pp. 795704-1, XP055032803.

* cited by examiner

METHOD OF CODING A HOLOGRAPHIC PATTERN, A CORRESPONDING CODING DEVICE AND COMPUTER PROGRAM

CROSS-REFERENCE TO RELATED APPLICATIONS

This Application is a Section 371 National Stage Application of International Application No. PCT/FR2013/050284, filed Feb. 12, 2013, the content of which is incorporated herein by reference in its entirety, and published as WO 2013/121140 on Aug. 22, 2013, not in English.

FIELD OF THE INVENTION

The present invention relates in general to the field of image processing, and more precisely to coding three-dimensional (3D) images and sequences of three-dimensional images.

More particularly, the present invention relates to coding at least one holographic pattern storing a light signal representative of the light received by at least one perspective object in a scene.

The invention may apply particularly, but not exclusively, to video coding performed using current video coding schemes and amendments thereto (MPEG, H.264, H.264 SVC, H.264 MVC, etc.) or future amendments (ITU-T/VCEG (H.265) or ISO/MPEG (HEVC)), and to the corresponding decoding.

PRIOR ART

In known manner, a holographic pattern is the result of a holographic method that consists in recording a light wavefront coming from a scene or an object by recording the value of this wavefront of monochromatic type on a semitransparent plate. Such recording is made possible by eliminating time variations in the phase of the light front by interference with a reference light wavefront at the same frequency as said light wavefront.

The holographic pattern as created in this way is a monochromatic image containing details of wavelength order of the light wavefront coming from the scene or the object. The image may be modeled as the Fresnel transform of the wavefront coming from the scene or the object, which transform has the property of dispersing spatial frequency details. Information in a holographic pattern is thus very poorly localized, and therefore lends itself poorly to conventional coding techniques.

A first example of coding such patterns is described in the document by E. Darakis and T. Naughton, entitled "Compression of digital hologram sequence MPEG-4", Proc. SPIE, Vol. 7358, 2009. In that document, coding is performed on a frame containing a set of time-indexed holographic patterns, said frame thus defining a holographic video. In the same manner as an image in a video sequence, each pattern of the frame is placed in succession as input to a video coder complying with the MPEG-4 standard in order to be subjected to block coding using a predictive scheme that makes use of spatial redundancies between patterns (intra coding) or by making use of time redundancies between the patterns (inter coding).

A second example of coding said patterns is described in the document by M. Liebling and M. Unser, entitled "Fresnelets: new multiresolution wavelet bases for digital holography", IEEE Trans. Image Processing, Vol. 12, No. 1, January 2003. As in the above-mentioned document, a frame is coded using a set of time-indexed holographic patterns, said frame thus defining a holographic video. Each pattern of the frame is modeled by a function to which filter banks are applied in order to obtain a decomposition in a given function base, e.g. wavelets.

A drawback of such examples of coding holographic patterns is that they remain very expensive in terms of calculation and the coded data obtained is very expensive to transmit in a stream that is intended in particular to be decoded. In addition, such coding methods do not take account of the fact that holographic patterns include dispersed information that was originally well localized in the space domain.

SUMMARY OF THE INVENTION

In a first aspect, the present invention provides a method of coding at least one holographic pattern recording a light signal representative of the light received by at least one perspective object in a scene.

The coding method of the invention is remarkable in that it performs the steps consisting in:
 determining, from the light signal and for each point $x_j(1 \leq j \leq M)$ of the holographic pattern, a set of N light rays passing through the point and corresponding respectively to N different viewing positions for viewing the pattern;
 generating, from the M sets of N determined light rays, a plurality N of two-dimensional views of the object corresponding respectively to the N viewing positions of the pattern, by causing M determined rays to intersect at each of the viewing positions that are contained in a viewing plane parallel to a plane containing the holographic pattern;
 arranging the N generated views as a multi-view image of the object, the N views corresponding respectively to the sub-images of the multi-view image; and
 compressing the multi-view image.

By means of reconstructing the light signal in this way in the form of a plurality of rays in the space domain, instead of reconstructing said signal by applying an inverse Fresnel transform, it becomes possible to reduce in non-negligible manner the time and the complexity required for performing the calculations for coding a holographic pattern.

In addition, such reconstruction coupled to making use of rays in the form of a plurality of views respectively representing a plurality of perspectives of the same 3D scene thus makes it possible to take advantage in optimum manner of the multiple redundancies that exist in space and time between the different views in order to code the holographic pattern effectively.

By not including redundant coding information in the coded signal for transmission, i.e. information that there is no point in transmitting, it is possible to obtain a significant reduction in the cost of signaling.

In a particular implementation, the determining step consists in demodulating the light signal in amplitude and in frequency so as to deliver for each point $x_j(1 \leq j \leq M)$ of the holographic pattern a set of N data pairs, the data in a pair under consideration being associated respectively with the amplitude and with the direction of a light ray passing via a point under consideration.

Such a provision serves to optimize the cost of coding significantly.

In another particular implementation, demodulation is performed by a Gabor transform or a wavelet transform.

Such transforms have the advantage of effectively localizing the spatial frequencies associated with a given position in the hologram.

In yet another particular implementation, during the step of generating the N views, for a current point $x_j (1 \leq j \leq M)$ of the holographic pattern, the viewing plane is subdivided into a plurality of N partitions, with the centroid of each partition corresponding to the point of intersection with the viewing plane of the light ray passing through the point $x_j$.

Such a provision has the advantage of associating clusters of pixels with the intensity value of a reference pixel.

In a variant of this other embodiment, during the step of generating the N views, for a current point $x'_j (1 \leq j \leq M)$ of the holographic pattern, the viewing plane is subdivided recursively into four partitions until each subpartition obtained by the subdivision contains only one centroid, the centroid of each subpartition corresponding to the point of intersection with the viewing plane of the light ray passing through the point $x'_j$.

Such a provision also has the advantage of allocating to pixel clusters the intensity value of a reference pixel.

According to yet another particular implementation, the step of compressing the multi-view image uses the following substeps:
  predicting the multi-view image as a function of at least one reference multi-view image that has previously been coded and then decoded, thereby delivering a predicted multi-view image;
  determining residual data by comparing the data resulting from the multi-view image with data relating to the above-mentioned predicted multi-view image;
  subjecting the determined residual data to a transform and to quantization; and
  coding the transformed and quantized residual data.

Such a provision makes it possible during coding to optimize the elimination of space and time redundancies between the N views of the resulting multi-view image in order significantly to reduce the cost of coding.

In yet another particular implementation, the coding is of the multi-view coding (MVC) type.

Such a provision makes it possible for holographic patterns to have applied thereto the standard MVC technique that until now has been devoted to coding multi-view images.

In corresponding manner, the invention provides a coding device suitable for performing the coding method of the invention. The coding device of the invention is thus for coding at least one holographic pattern having stored thereon a light signal representative of the light received by at least one perspective object in a scene.

Such a coding device is remarkable in that it comprises processor means that are suitable for:
  determining from the light signal, and for each point $x_j (1 \leq j \leq M)$ of the holographic pattern, a set of N light rays passing through the point and corresponding respectively to N different viewing positions for viewing said pattern;
  generating from the M determined sets of N light rays, a plurality of N two-dimensional views of the object corresponding respectively to the N viewing positions of the pattern by causing M determined rays to intersect at each of the viewing positions that are contained in a viewing plane parallel to a plane containing the holographic pattern;
  arranging the N generated views as a multi-view image of the object, the N views corresponding respectively to the sub-images of the multi-view image; and
  compressing the multi-view image.

In another aspect, the invention provides a computer program including instructions for performing the coding method of the invention when it is executed on a computer. The invention also provides a computer program on a data medium, the program including instructions adapted to performing the coding method of the invention, as described above.

The program may use any programming language and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means such as read-only memory (ROM), e.g. a compact disk (CD) ROM, or a microelectronic circuit ROM, or magnetic recording means, e.g. a floppy disk or a hard disk.

Furthermore, the data medium may be a transmissible medium such as an electrical or optical signal suitable for being conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

The above-mentioned computer program and coding device present at least the same advantages as those conferred by the coding method of the present invention.

BRIEF DESCRIPTION OF THE DRAWINGS

Other characteristics and advantages appear on reading about several preferred embodiments described with reference to the figures, in which.

DETAILED DESCRIPTION OF AN IMPLEMENTATION

Figure 1:
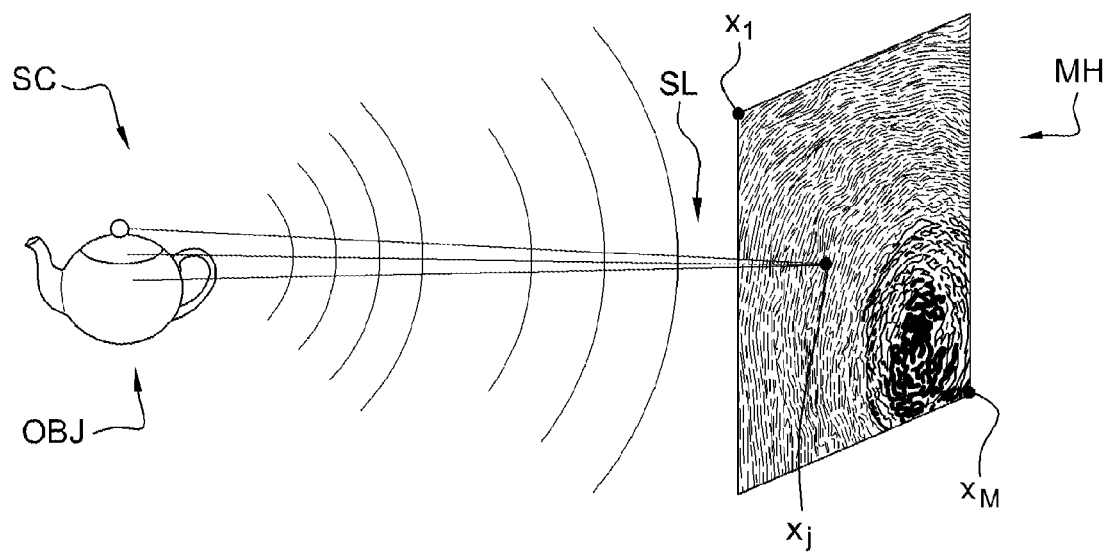
FIG. 1 shows an example of a holographic pattern to which the coding method of the invention is to be applied.

There follows a description of an implementation in which the coding method of the invention is used to code a current holographic pattern MH as shown in FIG. 1, having recorded therein a light signal SL representative of light received by at least one perspective object OBJ in a three-dimensional scene SC. In the example shown, the object OBJ is a teapot. In a method that is itself known, the holographic pattern MH contains a plurality of points $x_1, x_2, \ldots, x_j, \ldots, x_M$, with $1 \leq j \leq M$, which points are obtained by discretizing at a determined sampling pitch.

The holographic pattern MH may be single or it may form part of a set of patterns representing the same object and indexed in time, in other words a frame of a holographic video.

Figure 2:
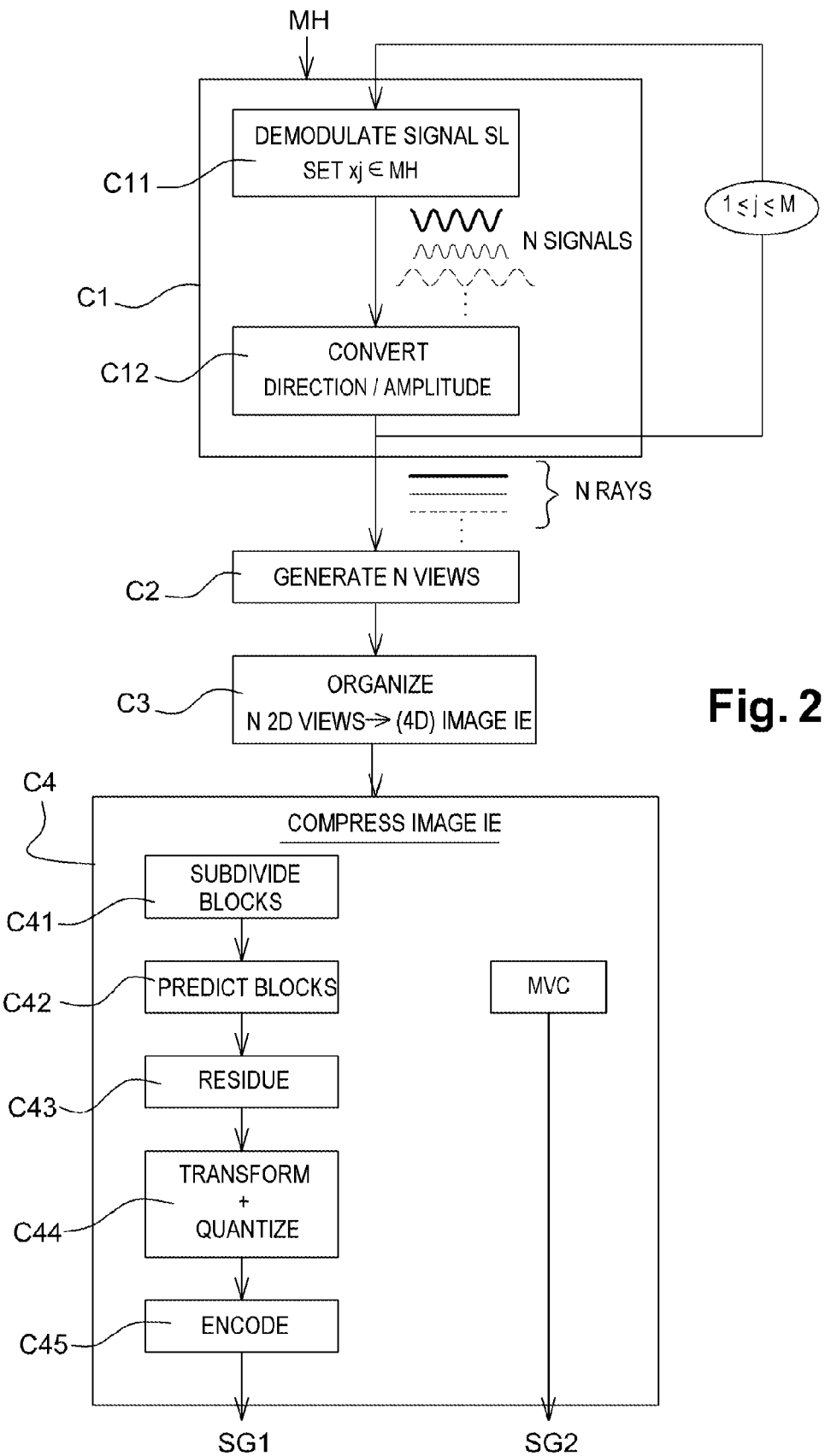
FIG. 2 shows the steps of the coding method of the invention.

FIG. 2 shows the coding method of the invention in the form of an algorithm comprising steps C1 to C4.

Figure 3:
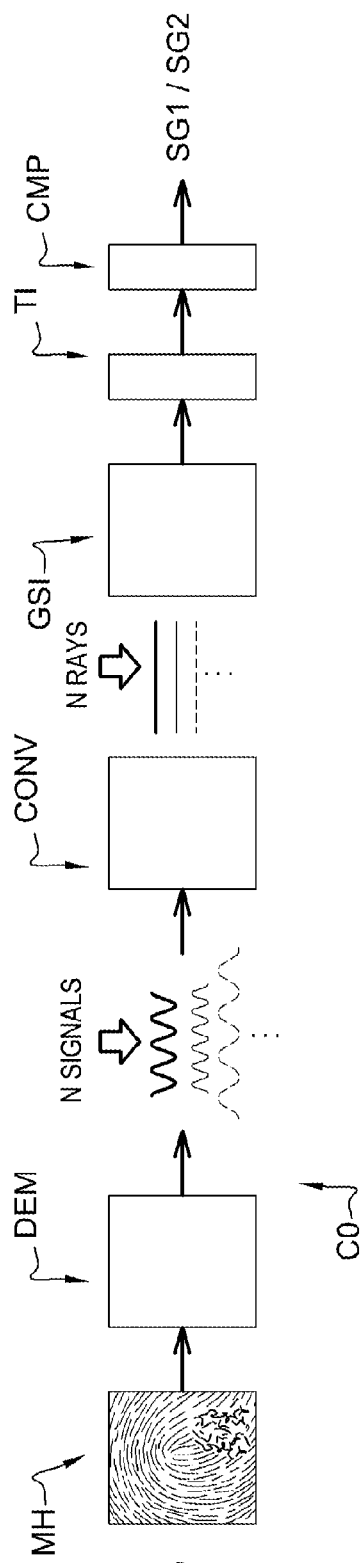
FIG. 3 shows an embodiment of a coder device of the invention.

In the implementation of the invention, the coding method of the invention is performed in a coder device C0 shown in FIG. 3.

A determination, first step C1 shown in FIG. 2 consists in determining from said light signal SL and for each point $x_j(1 \leq j \leq M)$ of said current holographic pattern MH, a set of N light rays passing through said point under consideration and corresponding respectively to N viewing positions for viewing said pattern at different angles. Such a step is performed by a demodulation software module DEM and by a conversion software module CONV as shown in FIG. 3.

With reference to FIGS. 2 and 3, the determination step C1 comprises a demodulation first substep C11 during which the demodulation module DEM demodulates the light signal SL in amplitude and in frequency in order to deliver, for each point $x_j(1 \leq j \leq M)$ of said current holographic pattern MH, a set of N signals of given amplitude and oriented spatial frequency. For reasons of clarity, only three of the N signals are shown in FIG. 3.

By way of example, such demodulation may be performed by a Gabor transform, a wavelet transform, a development as a series of wavelets, etc.

The determination step C1 also includes a conversion second substep C12 during which the N resulting signals are converted into N respective rays of given amplitude and direction.

In the preferred implementation, the demodulation substep C11 performs a Gabor transform. To this end, at each point $x_j(1 \leq j \leq M)$ of said current holographic pattern MH, Gabor filtering is applied in a set of 2D directions $(\theta_0, \ldots, \theta_N)$. A set $S_j$ of N amplitude and oriented spatial frequency data pairs is then obtained at each point $x_j(1 \leq j \leq M)$ such that:

$$S_j = \{(a_{j1}, f_{j1}), (a_{j2}, f_{j2}), \ldots, (a_{jN}, f_{jN})\}$$

when the amplitudes are greater than a given threshold.

At the end of the demodulation substep C11, M sets $S_1$ to $S_M$ of data pairs are obtained.

Thereafter, the conversion substep C12 converts each of the M sets $S_j$ to $S_M$ into M respective sets $SC_1$ to $SC_M$ of amplitude and 3D direction data pairs. For a point $x_j$ of the current holographic pattern MH, the set:

$$SC_j = \{(a_{j1}, d_{j1}), (a_{j2}, d_{j2}), \ldots, (a_{jN}, d_{jN})\}$$

is obtained in application of the equation $\sin(\alpha) = \lambda/f$ associating the spatial frequency $f$ with the diffraction direction $\alpha$ for an incident plane wave perpendicular to a plane containing said current holographic pattern MH, $\alpha$ being considered in an azimuth plane defined by said set of 2D directions $(\theta_0, \ldots, \theta_N)$.

As an alternative, the demodulation substep C11 applies a 2D wavelet transform to each point $x_j(1 \leq j \leq M)$ of said current holographic pattern MH. For this purpose, consideration is given to a generator wavelet $\phi$ and the transform:

$$a_{jN} = \int \phi^{\Theta k}(f_{jN} \cdot (x_c - T)) MH(T) dt$$

in order to obtain sufficient discretization of said set of 2D directions $(\theta_0, \ldots, \theta_N)$, with $x_c$ being a current point of the holographic pattern MH and T being an integration variable. The generator wavelet $\phi$ may be any function satisfying the conventional acceptability criterion:

$$\int_{-\infty}^{+\infty} \frac{|\hat{\varphi}(x)|^2}{x} dx < \infty$$

where $\hat{\varphi}$ designates the Fourier transform of $\phi$.

During a generation step C2 shown in FIG. 2, the M sets $SC_1$ to $SC_M$ of data pairs obtained from the conversion substep C12 are used to generate N two-dimensional (2D) views of the object OBJ. Such view generation is performed by a processing software module GSI as shown in FIG. 3.

Figure 4:
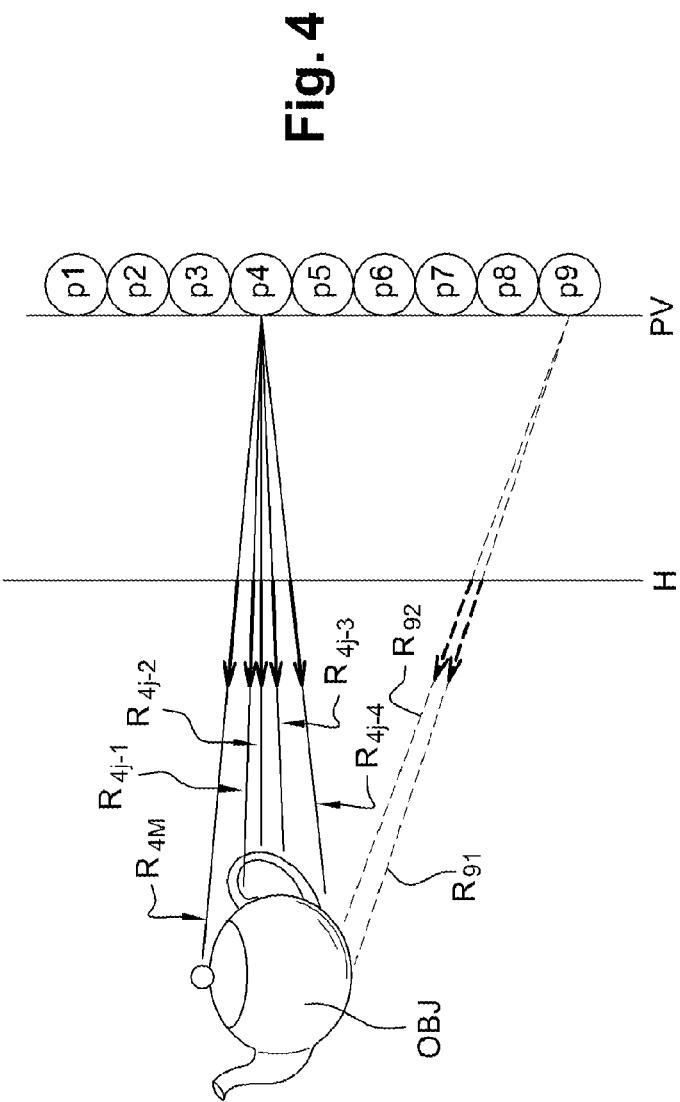
FIG. 4 is a diagram showing the step of generating a plurality of views performed in the coding method of the invention.

To this end, and as shown in FIG. 4, the N views generated correspond respectively to that which would be viewed by N respective observers situated respectively at N different angular viewing positions p1 to pN for viewing said holographic pattern MH. Such views are generated by causing M rays of amplitude and 3D directions as determined at the end of the substep C12 to intersect at each of said viewing positions contained in a common viewing plane PV parallel to the plane H containing said holographic pattern MH. In the example shown, N=9 and consequently nine viewing positions p1 to p9 are shown. For reasons of clarity in FIG. 4, only a few rays are shown and only in association with viewing positions p4 and p9.

Figure 5:
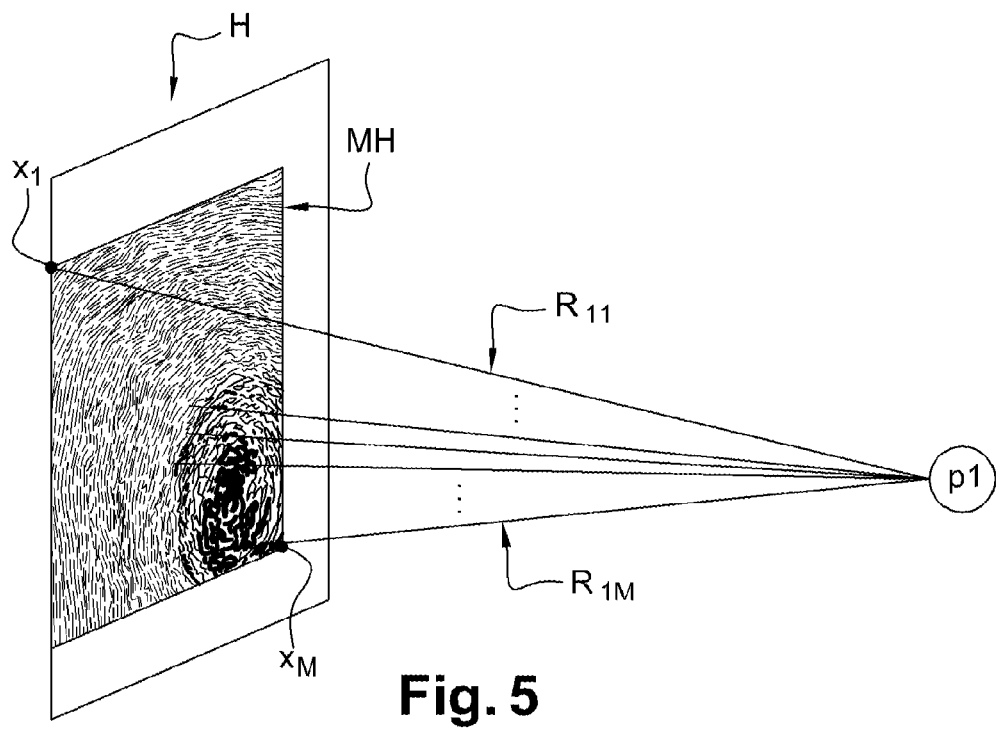
FIG. 5 is a diagram applying to a given viewing position of the holographic pattern and showing the light rays associated with this position and intersecting the holographic pattern.

As shown in FIG. 5, where for reasons of clarity only one viewing position is shown, e.g. p1, M rays $R_{11}, R_{12}, \ldots, R_{1M}$ intersect the holographic pattern MH contained in the plane H at M points $x_1, x_2, \ldots, x_M$ of the pattern.

Figure 6A:
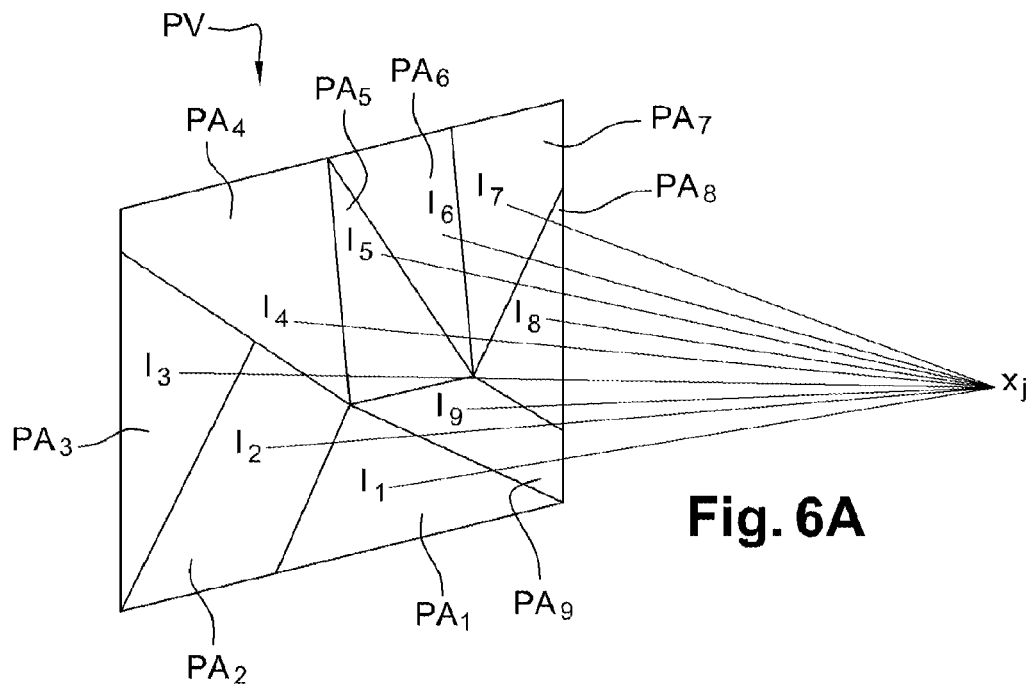
FIGS. 6A and 6B show respectively two particular implementations of subdividing the viewing plane during the step of generating a plurality of views as performed in the coding method of the invention.

In a first implementation as shown in FIG. 6A, during the step C2 of generating N views, and for a current point $x_j(1 \leq j \leq M)$ of said holographic pattern MH, the viewing plane PV is subdivided as a Voronoi diagram into a plurality of N partitions $PA_1$ to $PA_N$, with the centroid of each partition corresponding to the point of intersection with the viewing plane PV and a light ray passing through the point $x_j$ with given direction and amplitude. In the example shown in which N=9, $I_1$ to $I_9$ represent the nine points of intersection of the nine rays $R_{1j}, R_{2j}, \ldots, R_{9j}$ from the point $x_j$ and each having a respective given direction. Each partition $PA_1$ to $PA_N$ is associated with the amplitude of the corresponding one of the N rays $R_{1j}, R_{2j}, \ldots, R_{Nj}$.

Figure 6B:
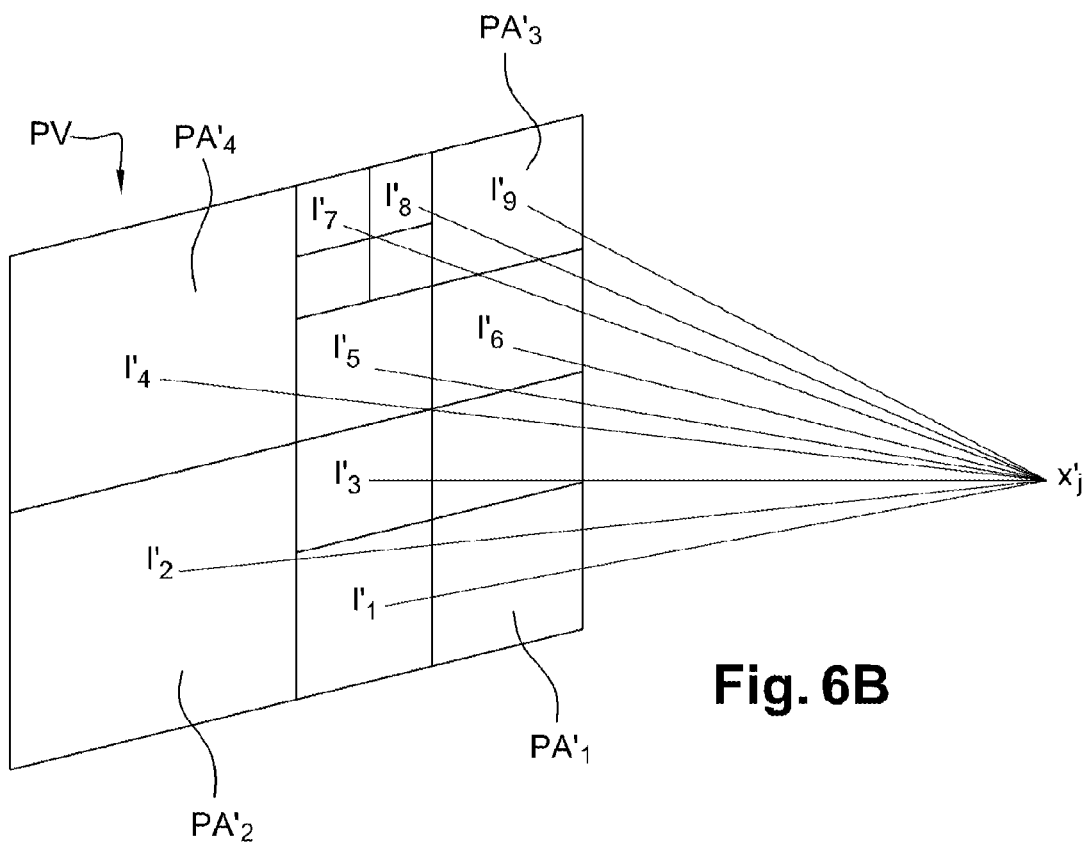

In a second implementation as shown in FIG. 6B, during the step C2 of generating N views, for a current point $x'_j(1 \leq j \leq M)$ of said holographic pattern MH, the viewing plane PV is subdivided recursively into four partitions $PA'_1$ to $PA'_4$ until each subpartition resulting from this subdivision contains only one centroid, the centroid of each subpartition corresponding to the point of intersection with the viewing plane and the light ray passing through the point $x'_j$. In the example shown where N=9, $I'_1$ to $I'_9$ represent the nine points of intersection of the nine rays $R'_{1j}, R'_{2j}, \ldots, R'_{9j}$ from the point x'$_j$ and each having a respective given direction. Each of the N subpartitions obtained is associated with the amplitude of the corresponding one of the N rays R'$_{1j}$, R'$_{2j}$, . . . , R'$_{Nj}$.

Figure 7:
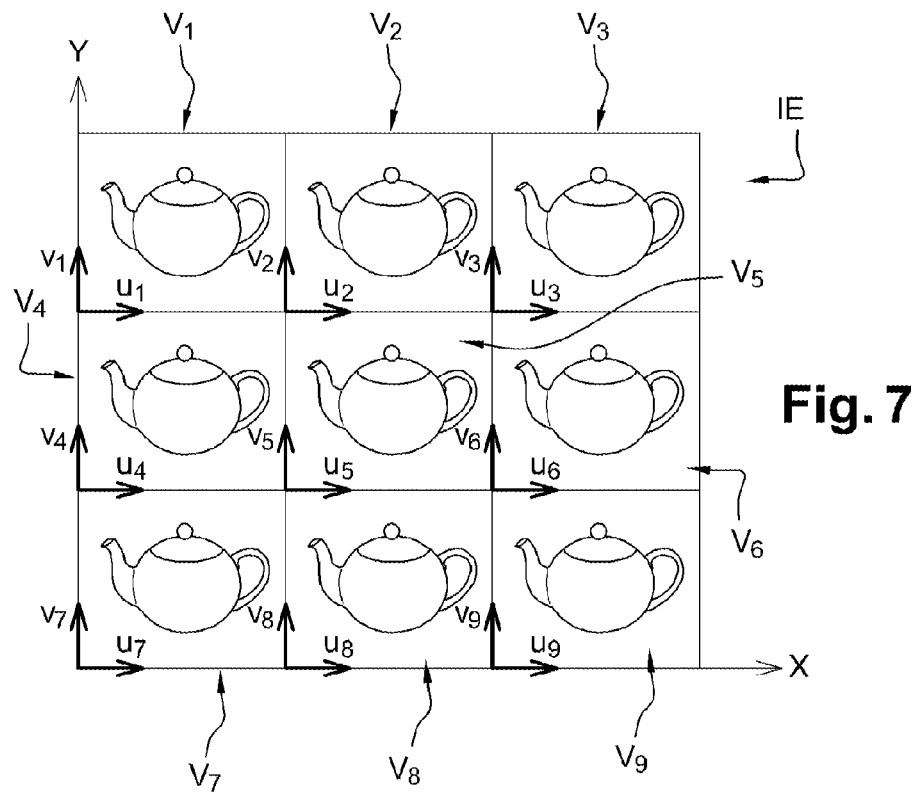
FIG. 7 is a diagram showing the multi-view image obtained from the plurality of views generated in the invention.

During a following step C3 shown in FIG. 1, the N generated views are organized as a single multi-view image IE following a predetermined path. Such a step is performed by an image processing software module TI as shown in FIG. 3. An example of such an image IE is shown in FIG. 7. In the example shown, N=9. The image IE that is contained in an (X,Y) frame of reference comprises nine views V$_1$ to V$_9$ of the same object OBJ, each of which is contained in a respective frame of reference (u$_1$,v$_1$) to (u$_N$,v$_N$). The views V$_1$ to V$_9$ correspond respectively to the viewing positions p1 to p9 as shown in FIG. 4, and by way of example they are organized one after another following a path, e.g. a zigzag path.

During a following compression step C4, as shown in FIG. 2, the multi-view image IE that has been generated is compressed.

Such a step is performed by a compression software module CMP shown in FIG. 3.

Given the particular arrangement of the N views making up the multi-view image IE, such compression is reliable and accurate since said compression makes use of redundancies both in space and in time between the N generated views.

In a first implementation shown in FIG. 2, said compression step C4 performs block predictive coding of the multi-view image IE using a scheme similar to that used for predictive coding of two-dimensional images as defined in the H.264 standard. Thus, the multi-view IE image may be intra coded (as the image I) or inter coded. When the image IE is inter coded, it may be coded:

either as an image P, i.e. as predicted in conventional manner from a multi-view image that has already been coded and then decoded;

or else as a (bidirectional) image B, i.e. as predicted relative to one or more past and future images.

To this end, the compression step C4 comprises substeps as described below.

During a substep C41 shown in FIG. 2, the current multi-view image IE is subdivided into a plurality of pixel blocks. The dimension of each of the blocks is of order 4 in the (X, Y, u, v) frame of reference shown in FIG. 7.

During a substep C42, shown in FIG. 2, each of the blocks of the current multi-view image is predicted as a function respectively of one or more reference blocks of a reference multi-view image, i.e. an image that has previously been coded and then decoded. This produces a plurality of predicted blocks.

During a substep C43, shown in FIG. 2, residual data is determined by comparing the data relating to each current block respectively with the data relating to each predicted block.

During a substep C44, shown in FIG. 2, the previously determined residual data is subjected to a transform and quantized. By way of example, the transform that is applied may be a discrete cosine transform (DCT).

During a substep C45, shown in FIG. 2, said quantized residual data is encoded.

In a second implementation shown in FIG. 2, said compression step C4 makes use of multi-view coding of the multi-view image IE. In known manner, such coding is performed by an MPEG-4 MVC algorithm.

At the end of the compression step C4, a coded view of signal SG1 (coded using blocks predictive coding) or SG2 (coded using MVC coding) is produced. Said signal is stored or else transmitted to a decoder (not shown).

The above-described coding method is reiterated for a plurality of holographic patterns belonging to a determined frame.

When the coded signal SG1 or SG2 is transmitted to a decoder, which decoder is adapted to reconstitute said number N of views from the encoded data contained in the signal SG1 or SG2.

Figure 8:
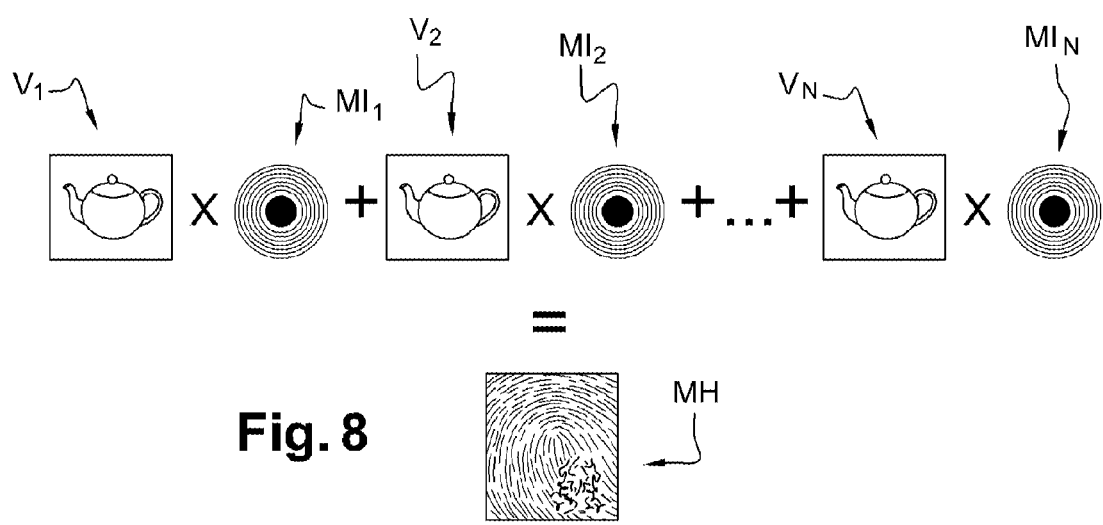
FIG. 8 is a diagram showing the implementation of reconstructing a holographic pattern coded using the invention.

In a first implementation shown in FIG. 8, the N reconstructed views V$_1$ to V$_N$ are modulated respectively with N interference patterns MI$_1$ to MI$_N$ that are calculated beforehand. The views as modulated in this way are then superposed in order to reconstitute the initial holographic pattern MH. By way of example, such a method is described in the document by Wendy Plesniak, Michael Halle, V. Michael Bove Jr., James Barabas, and Ravikanth Pappu, entitled "Reconfigurable image projection holograms", Optical Engineering 45(11), 115801 (November 2006).

Alternatively, the N reconstructed views V$_1$ to V$_N$ are transformed respectively into N individual wavefronts by means of a Fourier transform. The N wavefronts are then transported by a Fresnel transform into a common plane in order to reconstitute the initial holographic pattern MH. By way of example, such a method is described in the document by K. Yamamoto, T. Senoh, R. Oi, and T. Kurita, entitled "84K4-size computer generated hologram for 3D visual system using rendering technology", 2010 4$^{th}$ International Universal Communication Symposium (IUCS), October 2010, pp. 193-196.

Naturally, the implementations described above are given purely by way of non-limiting indication, and numerous modifications can easily be performed by the person skilled in the art without thereby going beyond the ambit of the invention.

The invention claimed is:
1. A method comprising:
coding at least one holographic pattern recording a light signal representative of the light received by at least one perspective object in a scene, said coding comprising the following acts performed by a coding device:
determining, from said light signal and for each point x$_j$(1≤j≤M) of said holographic pattern, a set of N light rays passing through said point and corresponding respectively to N different viewing positions for viewing said pattern;
generating, from the M sets of N determined light rays a plurality N of two-dimensional views of said object corresponding respectively to said N viewing positions of said pattern, by causing M determined rays to intersect at each of said viewing positions that are contained in a viewing plane parallel to a plane containing said holographic pattern;
arranging said N generated views as a multi-view image of said object, said N views corresponding respectively to the sub-images of said multi-view image; and
compressing said multi-view image, using the following sub-acts:
predicting said multi-view image as a function of at least one reference multi-view image that has previously been coded and then decoded, thereby delivering a predicted multi-view image;
determining residual data by comparing data resulting from said multi-view image with data relating to said predicted multi-view image;

subjecting the determined residual data to a transform and to quantization; and
coding the transformed and quantized residual data.

2. The coding method according to claim 1, during which said determining act comprises demodulating said light signal in amplitude and in frequency so as to deliver for each point $x_j(1 \leq j \leq M)$ of said holographic pattern a set of N data pairs, the data in a pair under consideration being associated respectively with the amplitude and with the direction of a light ray passing via said point.

3. The coding method according to claim 2, wherein demodulation is performed by a Gabor transform or a wavelet transform.

4. The coding method according to claim 1, wherein, during said act of generating said N views, for a current point $x_j(1 \leq j \leq M)$ of said holographic pattern, the viewing plane is subdivided into a plurality of N partitions, with the centroid of each partition corresponding to the point of intersection with the viewing plane of the light ray passing through the point $x_j$.

5. The coding method according to claim 1, wherein during said act of generating said N views, for a current point $x'_j(1 \leq j \leq M)$ of said holographic pattern, the viewing plane is subdivided recursively into four partitions until each subpartition obtained by said subdivision contains only one centroid, the centroid of each partition corresponding to the point of intersection with the viewing plane of the light ray passing through the point $x'_j$.

6. The coding method according to claim 1, during which the coding is of the MVC type.

7. A coding device for coding at least one holographic pattern recording a light signal representative of the light received by at least one perspective object in a scene, said device comprising:
a non-transmissible data medium comprising computer-readable instructions stored thereon; and
a processor configured by the instructions to perform acts of:
determining from said light signal, and for each point $x_j(1 \leq j \leq M)$ of said holographic pattern, a set of N light rays passing through said point and corresponding respectively to N different viewing positions for viewing said pattern;
generating from the M determined sets of N light rays, a plurality of N two-dimensional views of said object corresponding respectively to said N viewing positions of said pattern by causing M determined rays to intersect at each of said viewing positions that are contained in a viewing plane (PV) parallel to a plane (H) containing said holographic pattern;
arranging said N generated views as a multi-view image of said object, said N views corresponding respectively to the sub-images of said multi-view image; and
compressing said multi-view image, using the following sub-acts:
predicting said multi-view image as a function of at least one reference multi-view image that has previously been coded and then decoded, thereby delivering a predicted multi-view image;
determining residual data by comparing data resulting from said multi-view image with data relating to said predicted multi-view image;
subjecting the determined residual data to a transform and to quantization; and
coding the transformed and quantized residual data.

8. A non-transmissible computer readable data medium storing a computer program including instructions for executing steps of a method when said program is executed by a computer, wherein the method comprises:
coding at least one holographic pattern recording a light signal representative of the light received by at least one perspective object in a scene, said coding comprising:
determining, from said light signal and for each point $x_j(1 \leq j \leq M)$ of said holographic pattern, a set of N light rays passing through said point and corresponding respectively to N different viewing positions for viewing said pattern;
generating, from the M sets of N determined light rays a plurality N of two-dimensional views of said object corresponding respectively to said N viewing positions of said pattern, by causing M determined rays to intersect at each of said viewing positions that are contained in a viewing plane parallel to a plane containing said holographic pattern;
arranging said N generated views as a multi-view image of said object, said N views corresponding respectively to the sub-images of said multi-view image; and
compressing said multi-view image, using the following sub-acts:
predicting said multi-view image as a function of at least one reference multi-view image that has previously been coded and then decoded, thereby delivering a predicted multi-view image;
determining residual data by comparing data resulting from said multi-view image with data relating to said predicted multi-view image;
subjecting the determined residual data to a transform and to quantization; and
coding the transformed and quantized residual data.

* * * * *